United States Patent [19]
Tramezzani

[11] Patent Number: 4,893,977
[45] Date of Patent: Jan. 16, 1990

[54] SELF-LOCKING UNIT

[75] Inventor: Giancarlo Tramezzani, Ponte Tresa, Switzerland

[73] Assignee: Alian International AG, Triesen, Liechtenstein

[21] Appl. No.: 385,923

[22] Filed: Jul. 25, 1989

Related U.S. Application Data

[60] Division of Ser. No. 208,833, Jun. 20, 1988, abandoned, which is a continuation of Ser. No. 938,345, Dec. 3, 1986, abandoned, which is a continuation of Ser. No. 673,129, Nov. 16, 1984, abandoned.

[30] Foreign Application Priority Data

Jan. 16, 1984 [IT] Italy .................................. 52838[U]

[51] Int. Cl.⁴ ............................................. F16B 39/22
[52] U.S. Cl. .................... 411/278; 411/222; 411/280; 411/437; 411/937.1
[58] Field of Search ............... 411/277, 278, 280, 937, 411/937.1, 276, 279, 266, 262, 248, 253, 254, 225, 235, 237, 222, 437

[56] References Cited

U.S. PATENT DOCUMENTS

| | | | |
|---|---|---|---|
| D. 22,813 | 9/1893 | Rouse | 411/437 X |
| 1,041,920 | 10/1912 | Ward | 411/278 |
| 1,346,730 | 7/1920 | Viebrock | 411/237 |
| 1,774,081 | 8/1930 | Burns | 411/280 |
| 2,846,701 | 8/1958 | Bedford | 411/280 X |
| 2,870,668 | 1/1959 | Flahaut | 411/436 |
| 3,240,248 | 3/1966 | Waltermire | 411/277 |
| 3,342,233 | 9/1967 | Meisel | 411/280 |
| 3,381,732 | 5/1968 | Engelmann | 411/937.1 X |
| 3,417,801 | 12/1968 | Berberian | 411/278 |
| 3,687,182 | 8/1972 | Grimm | 411/280 |
| 4,408,363 | 10/1983 | Doree | 408/227 X |

FOREIGN PATENT DOCUMENTS

| | | | |
|---|---|---|---|
| 536147 | 3/1955 | Belgium | 411/437 |
| 49725 | 8/1966 | Fed. Rep. of Germany | 411/280 |
| 764544 | 3/1934 | France | 411/278 |
| 907759 | 7/1945 | France | 411/280 |
| 2227780 | 11/1974 | France | 411/437 |
| 130874 | 5/1977 | German Democratic Rep. | 411/437 |
| 626290 | 9/1978 | U.S.S.R. | 411/427 |

Primary Examiner—Rodney M. Lindsey
Attorney, Agent, or Firm—Helfgott & Karas

[57] ABSTRACT

An improved self-locking nut comprising a threaded upper collar provided with longitudinal slots defining in the collar a plurality of circular arc segments compressed by a helical external spring. The slots may widen upwardly in V or U-shape to prevent the segments from contacting one another.

2 Claims, 6 Drawing Sheets

SELF-LOCKING UNIT

This is a division of application Ser. No. 208,833, filed June 20, 1988 which was a continuation application of Ser. No. 938,345 filed Dec. 3, 1986 which in turn was a continuation of Ser. No. 673,129 filed Nov. 16, 1984, now all three abandoned.

BACKGROUND OF THE INVENTION

This invention relates to an improved self-locking nut. More particularly, it relates to a self-locking nut of the type having a cylindrical end compressed by a helical spring.

Some types of self-locking nuts are known which have a cylindrical or the like end provided with vertical slots which define circular arc segments adapted to be resiliently compressed by a radially acting helical external spring.

One of these nuts is described in U.S. Pat. No. 3,417,801 assigned to Bemex, France, which will now be described by way of example.

Although this nut may be considered efficient with regard to resisting vibrations it still has some operative disadvantages which become particularly apparent when the nut is to be re-used after some application. In fact, as the vertical slots at the cylindrical end or collar are very narrow, the dirt and foreign matter which will penetrate into the slots during use cannot be expelled when the collar is contracted by the external spring after unscrewing the nut. For re-using the nut it is therefore necessary to effect a long and expensive cleaning operation by compressed air, solvents or mechanical means, which constitutes the first one of the aforementioned disadvantages.

Further, as the walls of the slots are very close to one another, their range of resilience or compressibility by the spring is very limited because after a certain degree of bending in the radial direction, the upper edges of the circular arc segments contact one another. The structural limitation of the compressibility of the collar impairs the adaptability of the nut to screws or rods having a "lean" thread and thus constitutes a further severe disadvantage.

SUMMARY OF THE INVENTION

It is an object of the present invention to eliminate or reduce the aforementioned disadvantages by providing an improved self-locking nut of the type mentioned above, in which the dirt accumulating in the slots of the collar during use can be automatically expelled during or after screwing off the nut, without requiring particular cleaning operations, this nut being further provided with a collar that is compressible to a greater extent to permit its adaptation to a greater variety of screws.

These and other objects and advantages of the invention, which will appear from the following description, are achieved according to the invention by a improved selflocking nut comprising an inwardly threaded upper collar provided with longitudinal slots defining a plurality of circular arc segments compressed by an external helical spring, characterized in that said slots widen upwardly in V-shape to prevent the circular arc segments from contacting one another. Longitudinal slots are also provided in the upper face of the nut in radial alignment with and outwardly of the longitudinal slots in the collar to enable expulsion of dirt that may have accumulated in the slots in the collar.

DESCRIPTION OF PREFERRED EMBODIMENTS

Figure 1:
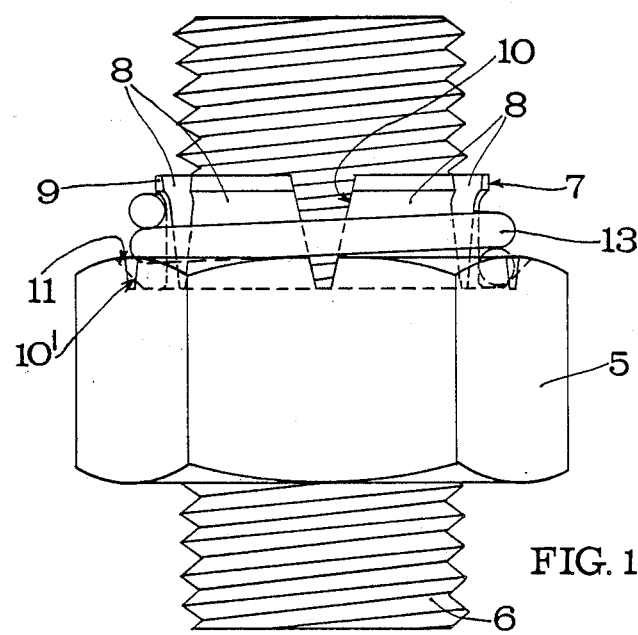
FIG. 1 is an elevational view of a nut according to the invention, shown as screwed onto a threaded rod.
Figure 2:
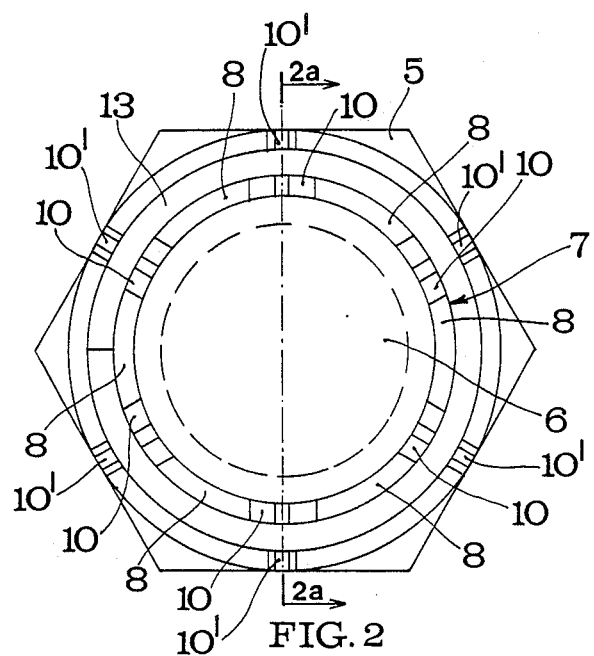
FIG 2 is a top plan view of the assembly of FIG. 1.
Figure 2A:
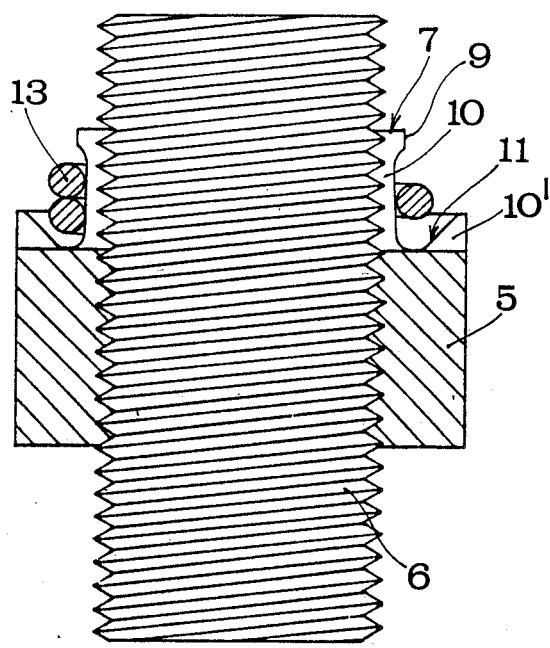
FIG. 2a is a vertical section taken through line 2a/2a in FIG. 2.
Figure 3:
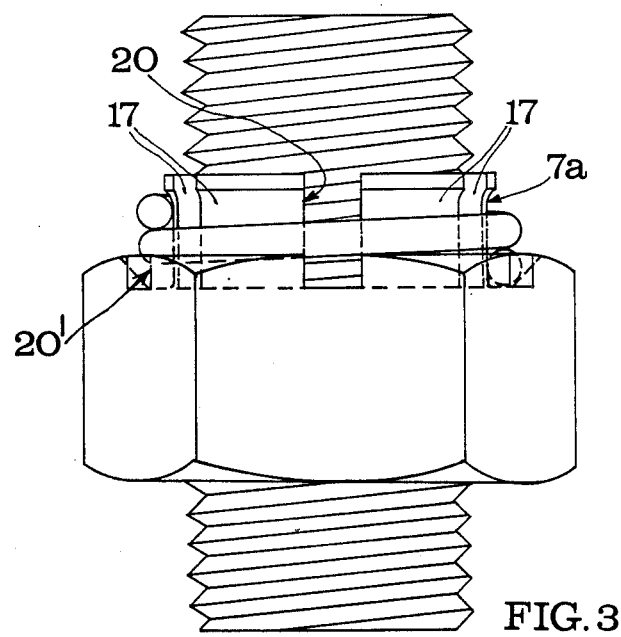
FIG. 3 is an elevational view of a second embodiment of the nut according to the invention.
Figure 4:
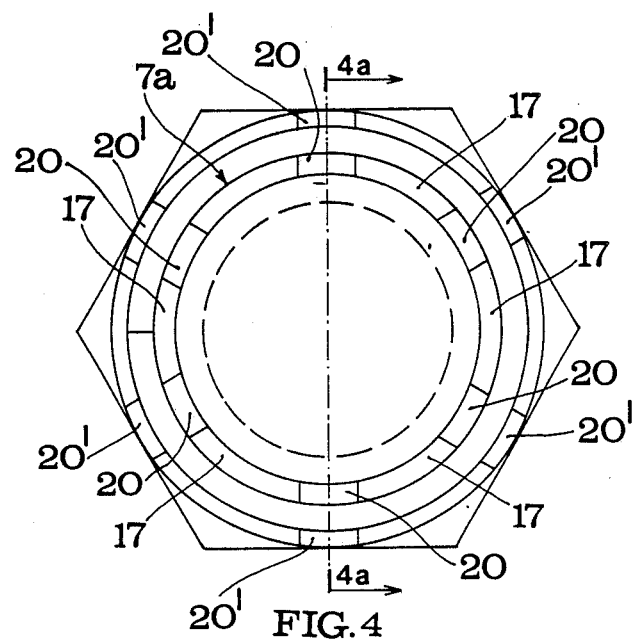
FIG. 4 is a top plan view of the assembly of FIG. 3.
Figure 4A:
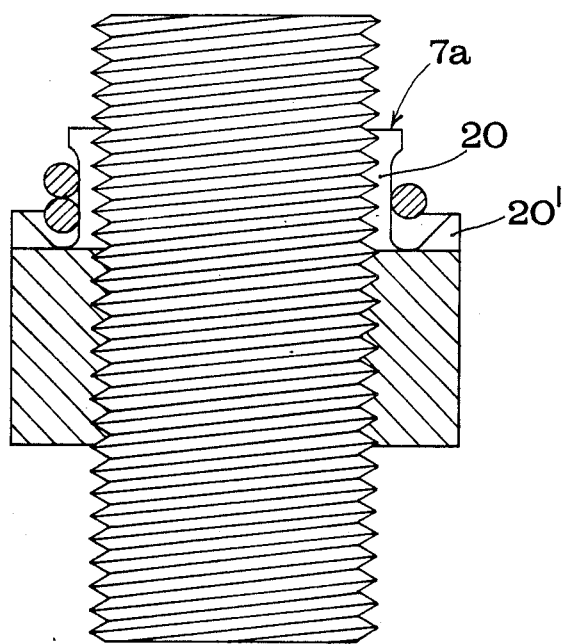
FIG. 4a is a vertical section taken through line 4a—4a in FIG. 4.

Referring to FIGS. 1 and 2, denoted by 5 is a nut having an upper cylindrical end or collar 7 provided with an internal thread 5' which is continuous to that of the nut. In the embodiments of FIGS. 3 and 4 and also FIGS. 5 and 6 the internal threads of the nuts are also continuous with that of the collar. As shown, the nut is screwed onto a threaded rod 6.

According to the invention the collar 7 is provided with V-shaped slots 10 to define a series of circular arc segments 8 having an upper outer rib 9. A recess 11 is provided on the upper surface of the nut to accommodate a helical spring 13 surrounding the collar 7 to compress the segments 8 radially against the screw 6. As seen in FIGS. 1 and 2, the V-shaped slots 10', in radial alignment with the V-shaped slots 10, are provided annularly in spaced apart relation in the upper face of the nut 5.

When the nut is unscrewed, the widening V-shape of the slots 10 together with the considerable resilience of the segments 8 permits the expulsion of the foreign matter accumulating during use.

FIGS. 3 and 4 show another embodiment of the invention similar to the one described above, but having a collar 7a with slots 20 having parallel walls which however are spaced from one another by a greater distance than the typical spacing in conventional nuts. As seen in FIGS. 3 and 4, slots 20 are provided in the upper face of the nut in radial alignment with slots 20 in the collar 7a.

In fact, even by maintaining the walls of the slots vertical, but radically changing the dimensional relation between the slots 20 and the segments 17 and completely re-designing the dimensions of the collar 7a it is possible to obtain a greater resilience of the segments on unscrewing the nut and thus an automatic expulsion of the dirt penetrating into the slots.

Also the condition that the upper edges of the segments do not contact one another after unscrewing the nut is maintained as has been mentioned in connection with the first embodiment of the invention.

To summarize, FIGS. 3 and 4 involve a self-locking nut which comprises a threaded upper annular collar 7a provided with substantially U-shaped longitudinal slots 20 defining in the annular collar between adjoining slots a plurality of arcuate segments 17 compressed by outer helical springs 17a. The slots 20 have a predetermined arcuate and radial extent, the cummulative arcuate extent of the adjoining U-shaped slots will be seen to be comparable to the arcuate extent of the arcuate segments between adjoining slots, the radial extent of the slots in the annular collar being shorter than their arcuate extent in the collar. To enable automatic expulsion of dirt accumulating in the collar slots during tightening or loosening of the nut, the latter is provided with inwardly extending slots in an upper face thereof in radial alignment with and outwardly of the longitudinal slots in the collar. The slots in the upper face of the nut have a shape corresponding to that of the slots in the collar.

Figure 5:
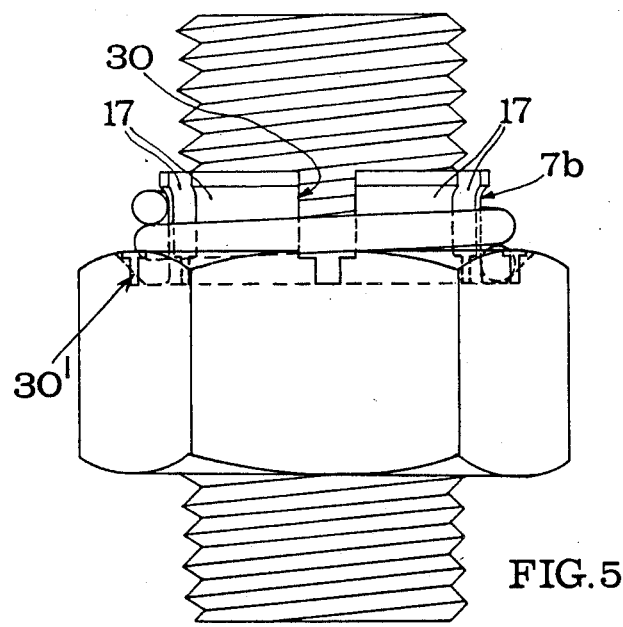
FIG. 5 is an elevational view of a third embodiment of the nut according to the invention.
Figure 6:
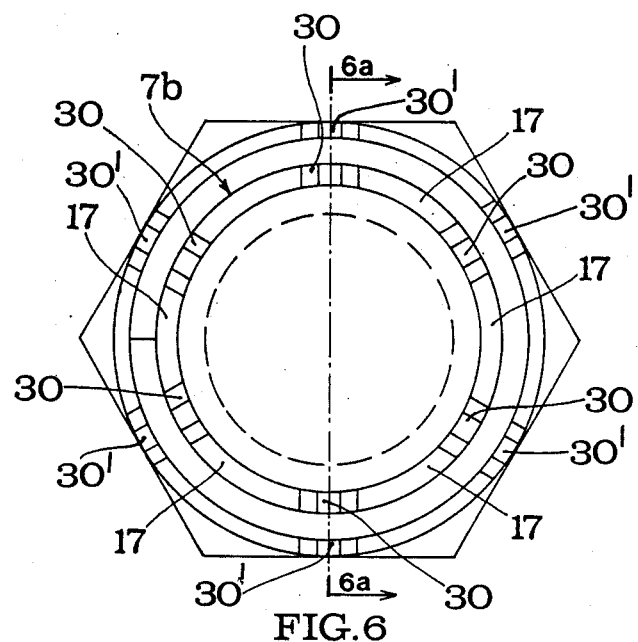
FIG. 6 is a top plan view of the assembly of FIG. 5.
Figure 6A:
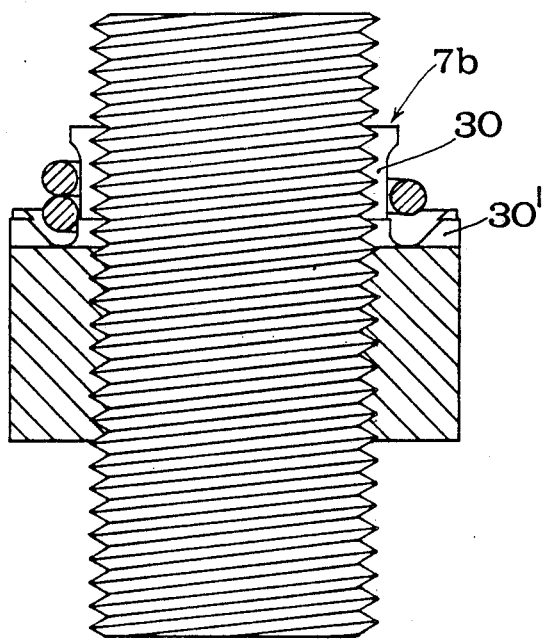
FIG. 6a is a vertical section taken through line 6a—6a in FIG. 6.

FIGS. 5 and 6 show a third embodiment of the nut according to the invention, similar to the one described above, but having a collar 7b provided with slots 30 of double U-shape. The relation between the relative height of the upper, larger U and the lower, narrower U may deviate considerably from the illustration in the drawing until it becomes inverted. In other words, the upper U may be wide and very low and the lower U may be narrow and very high. With the other conditions unchanged, this solution permits to vary the braked torque of the nut. As in FIGS. 1 to 4, similar double U-shaped slots 30' are provided in the upper face of the nut in radial alignment with slots 30. Also as will be seen in the drawings for the 3 embodiments the slots in the collars extend downwardly into the nut at substantially the level of the nut slots 10' in FIGS. 1 and 2, 20' in FIGS. 3 and 4 and 30' in FIGS. 5 and 6.

The advantages derived from the structure of the self-locking nut according to the invention are apparent from the foregoing description. In particular, it is to be noted that this nut can be immediately used again for a new application without requiring a cleaning operation as is the case with the conventional nuts of the same type.

Although some preferred embodiments of the invention have been described in detail herein and illustrated in the accompanying drawings, it is to be understood that the invention is not limited to these precise embodiments and that numerous changes and modifications obvious to one skilled in the art may be made therein without departing from the scope of the invention as defined by the appended claims.

I claim:

1. A self-locking nut assembly, comprising a nut including a main body and an internally threaded annular collar upwardly extending from said main body and being integral therewith, said main body having an upper face facing said collar and formed with a substantially circular recess; and a helical spring supported in said circular recess and extending upwardly therefrom to surround said collar, said collar being provided with a plurality of circumferentially spaced vertically extending slots defining therebetween a plurality of arcuate segments compressed by said helical spring, said main body being formed in said upper face with a plurality of circumferentially spaced-apart longitudinal slots being in radial alignment and in communication with said slots of said collar and formed radially outwardly from said slots of said collar and forming therewith continual slots, each of said continual slots having at said upper face of said main body in a non-screwed and non-compressed position of said nut a width which is smaller than the width of said continual slots at an open end thereof at said collar so as to enable automatic expulsion of dirt accumulating in said collar slots during tightening or loosening the nut assembly on a screw, each continual slot being of a double U-shape, comprising a narrow U-shape and a wide U-shape, said narrow U-shape extending upwardly from said main body into said wide U-shape, said wide U-shape extending to said open end.

2. The nut assembly as defined in claim 1, wherein said collar has at an upper end thereof an outwardly extending rim for supporting an upper end of said spring.

* * * * *